(12) United States Patent
Chaponniere

(10) Patent No.: US 8,233,932 B2
(45) Date of Patent: Jul. 31, 2012

(54) METHOD AND APPARATUS FOR IMPROVING SIGNALING RELIABILITY IN WIRELESS COMMUNICATIONS

(75) Inventor: Etienne F. Chaponniere, Rome (IT)

(73) Assignee: QUALCOMM Incorporated, San Diego, CA (US)

( * ) Notice: Subject to any disclaimer, the term of this patent is extended or adjusted under 35 U.S.C. 154(b) by 1200 days.

(21) Appl. No.: 12/024,051

(22) Filed: Jan. 31, 2008

(65) Prior Publication Data

US 2008/0194283 A1 Aug. 14, 2008

Related U.S. Application Data

(60) Provisional application No. 60/888,007, filed on Feb. 2, 2007.

(51) Int. Cl.
 H04B 7/00 (2006.01)
 H04Q 11/12 (2006.01)

(52) U.S. Cl. .......... 455/522; 455/69; 455/68; 455/127.1

(58) Field of Classification Search .................. 455/522, 455/69, 68, 127.1; 370/331, 329, 332
See application file for complete search history.

(56) References Cited

U.S. PATENT DOCUMENTS

| 7,343,172 | B2 | 3/2008 | Hwang |  |
|---|---|---|---|---|
| 7,447,515 | B2 | 11/2008 | Han et al. |  |
| 7,680,508 | B2 * | 3/2010 | Liljestrom et al. | ............ 455/522 |
| 7,876,727 | B2 * | 1/2011 | Hwang | ......................... 370/331 |
| 2003/0228876 | A1 * | 12/2003 | Hwang | ......................... 455/522 |
| 2006/0034216 | A1 * | 2/2006 | Kim et al. | ..................... 370/328 |
| 2006/0185507 | A1 * | 8/2006 | Trendall | ......................... 89/180 |
| 2006/0281441 | A1 * | 12/2006 | Okochi | ......................... 455/411 |

FOREIGN PATENT DOCUMENTS

| WO | 2004019513 | 3/2004 |
|---|---|---|
| WO | 2005055485 | 6/2005 |

OTHER PUBLICATIONS

International Search Report—PCT/US08/052848—International Search Authority—European Patent Office—Jun. 25, 2008.
Written Opinion—PCT/US08/052848—International Search Authority—European Patent Office, Munich—Jun. 25, 2008.
QUALCOMM Europe, "HS-SCCH-less HS-PDSCH Operation for Improved Support of IMS Real Time Services, R1-051511." Nov. 11, 2005, XP002467442.

* cited by examiner

*Primary Examiner* — Tilahun B Gesesse
(74) *Attorney, Agent, or Firm* — Charles Chesney

(57) ABSTRACT

Techniques for sending signaling at different power levels in different operating modes are described. In one design, a UE may send signaling at a first power level in a first operating mode and may send the signaling at a second power level in a second operating mode. The UE may send the signaling with a ternary indication in the first operating mode and with an on/off keying (OOK) indication in the second operating mode. The signaling may be for acknowledgement (ACK). The UE may send ACK, negative acknowledgement (NACK), and discontinuous transmission (DTX) with ternary indications in the first operating mode. The UE may send ACK and DTX with OOK indications in the second operating mode. The UE may receive at least one power offset from a network entity and may determine the first and second power levels based on the received power offsets(s).

38 Claims, 7 Drawing Sheets

METHOD AND APPARATUS FOR IMPROVING SIGNALING RELIABILITY IN WIRELESS COMMUNICATIONS

The present application claims priority to provisional U.S. Application Ser. No. 60/888,007, entitled "METHOD AND APPARATUS FOR IMPROVING SIGNALING RELIABILITY IN WIRELESS COMMUNICATIONS," filed Feb. 2, 2007, assigned to the assignee hereof and incorporated herein by reference.

BACKGROUND

I. Field

The present disclosure relates generally to communication, and more specifically to techniques for sending signaling in a wireless communication system.

II. Background

In a wireless communication system, a Node B may transmit data on the downlink to a user equipment (UE). The UE may receive the data transmission from the Node B and decode the received transmission. The UE may send signaling on the uplink to the Node B to indicate whether or not the data transmission was correctly decoded by the UE. The Node B may use the signaling to decide whether to retransmit the data (if decoded in error) or to transmit new data. It is desirable to transmit the signaling with as little power as possible while achieving the desired reliability for the signaling.

SUMMARY

Techniques for sending signaling at different power levels in different operating modes to achieve the desired reliability for the signaling are described herein. In one design, the signaling may be sent using different modulation schemes in different operating modes and may be sent at different power levels in different operating modes to achieve the desired misdetection probabilities.

In one design, a UE (or some other entity) may send signaling at a first power level in a first operating mode and may send the signaling at a second power level in a second operating mode, with the second power level being higher than the first power level. The UE may send the signaling (i) with a ternary indication for one of three possible signal values in the first operating mode and (ii) with an on/off keying (OOK) indication for one of two possible signal values in the second operating mode. The signaling may comprise acknowledgement (ACK). The UE may send ACK, negative acknowledgement (NACK) and discontinuous transmission (DTX) with ternary indications in the first operating mode. The UE may send ACK and DTX with OOK indications in the second operating mode.

The UE may receive at least one power offset from a network entity and may determine the first and second power levels based on the received power offset(s). In one design, the UE may receive a first power offset for ACK in the first operating mode and a second power offset for ACK in the second operating mode. The UE may determine the first and second power levels based on the first and second power offsets, respectively. In another design, the UE may receive a power offset for ACK in the first operating mode and may determine the first and second power levels based on this power offset. In yet another design, the UE may receive a first power offset for ACK and a second power offset for NACK in the first operating mode. The UE may determine the first power level for ACK in the first operating mode based on the first power offset and may determine the second power level for ACK in the second operating mode based on the first and/or second power offset.

The first operating mode may correspond to a regular HS-SCCH mode, and the second operating mode may correspond to an HS-SCCH less mode, which are described below. The UE may receive control information with data transmission in the first operating mode and may receive no control information with data transmission in the second operating mode.

Various aspects and features of the disclosure are described in further detail below.

DETAILED DESCRIPTION

The techniques described herein may be used for various wireless communication systems such as Code Division Multiple Access (CDMA) systems, Time Division Multiple Access (TDMA) systems, Frequency Division Multiple Access (FDMA) systems, Orthogonal FDMA (OFDMA) systems, Single-Carrier FDMA (SC-FDMA) systems, etc. The terms "system" and "network" are often used interchangeably. A CDMA system may implement a radio technology such Universal Terrestrial Radio Access (UTRA), cdma2000, etc. UTRA includes Wideband-CDMA (W-CDMA) and other CDMA variants. cdma2000 covers IS-2000, IS-95 and IS-856 standards. UTRA is part of Universal Mobile Telecommunication System (UMTS), and both are described in documents from an organization named "3rd Generation Partnership Project" (3GPP). cdma2000 is described in documents from an organization named "3rd Generation Partnership Project 2" (3GPP2). These various radio technologies and standards are known in the art. For clarity, certain aspects of the techniques are described below for UMTS, and UMTS terminology is used in much of the description below.

Figure 1:
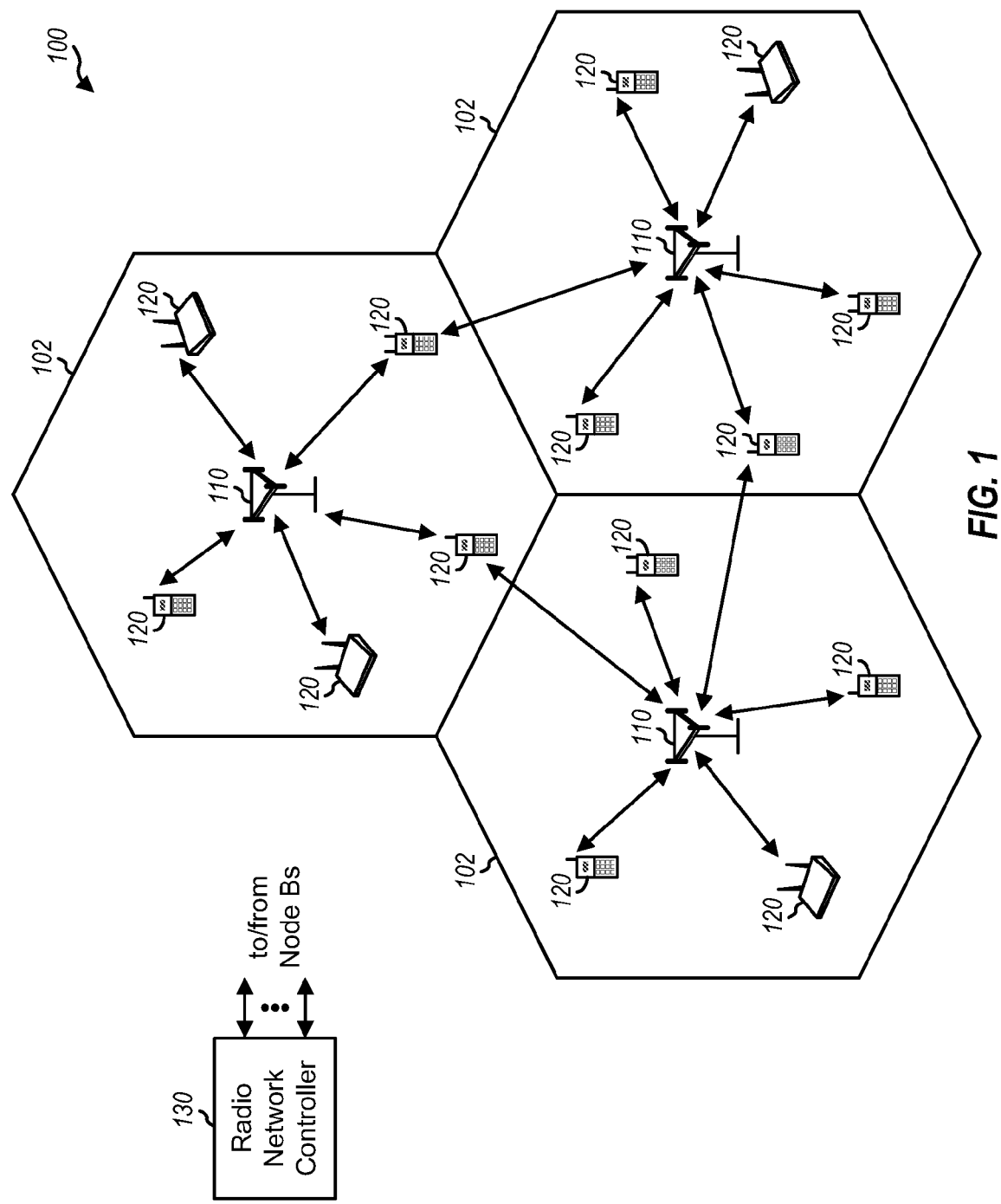
FIG. 1 shows a wireless communication system.

FIG. 1 shows a wireless communication system 100, which may also be referred to as a Universal Terrestrial Radio Access Network (UTRAN) in UMTS. System 100 includes multiple Node Bs 110 that support communication for multiple UEs 120. A Node B is generally a fixed station that communicates with the UEs and may also be referred to as an evolved Node B (eNode B), a base station, an access point, etc. Each Node B 110 provides communication coverage for a particular geographic area and supports communication for the UEs located within the coverage area. A Radio Network Controller (RNC) 130 couples to Node Bs 110 and provides coordination and control for these Node Bs.

UEs 120 may be dispersed throughout the system, and each UE may be stationary or mobile. A UE may also be referred to as a mobile station, a terminal, an access terminal, a subscriber unit, a station, etc. A UE may be a cellular phone, a personal digital assistant (PDA), a wireless device, a handheld device, a wireless modem, a laptop computer, etc.

In UMTS, data for a UE may be processed as one or more transport channels at a higher layer. The transport channels may carry data for one or more services such as voice, video, packet data, etc. The transport channels may be mapped to physical channels at a physical layer. The physical channels may be channelized with different channelization codes and may thus be orthogonal to one another in the code domain. UMTS uses orthogonal variable spreading factor (OVSF) codes as the channelization codes for the physical channels.

3GPP Release 5 and later supports High-Speed Downlink Packet Access (HSDPA), which is a set of channels and procedures that enable high-speed packet data transmission on the downlink. For HSDPA, a Node B may send data on a High Speed Downlink Shared Channel (HS-DSCH), which is a downlink transport channel that is shared by all UEs in both time and code. The HS-DSCH may carry data for one or more UEs in each transmission time interval (TTI). For UMTS, a 10 millisecond (ms) radio frame is partitioned into five 2-ms subframes, each subframe includes three slots, and each slot has a duration of 0.667 ms. A TTI is equal to one subframe for HSDPA and is the smallest unit of time in which a UE may be scheduled and served. The sharing of the HS-DSCH may change dynamically from TTI to TTI.

Table 1 lists some downlink and uplink physical channels used for HSDPA and provides a short description for each physical channel.

TABLE 1

| Link | Channel | Channel Name | Description |
| --- | --- | --- | --- |
| Downlink | HS-PDSCH | High Speed Physical Downlink Shared Channel | Carry data sent on the HS-DSCH for different UEs. |
| Downlink | HS-SCCH | Shared Control Channel for HS-DSCH | Carry control information for the HS-PDSCH. |
| Uplink | HS-DPCCH | Dedicated Physical Control Channel for HS-DSCH | Carry feedback for downlink transmission in HSDPA. |

For HSDPA, a Node B may use up to fifteen 16-chip OVSF codes with spreading factor of 16 (SF=16) for the HS-PDSCH. The Node B may also use a configurable number of 128-chip OVSF codes with spreading factor of 128 (SF=128) for the HS-SCCH.

HSDPA supports hybrid automatic retransmission (HARQ). For HARQ on the downlink, a Node B may send a new transmission of a transport block to a UE and may send one or more retransmissions until the transport block is decoded correctly by the UE, or the maximum number of retransmissions has been sent, or some other termination condition is encountered. The Node B may thus send a variable number of transmissions for a transport block. A transport block may also be referred to as a packet, a data block, etc.

For HSDPA, a UE may be configured for either regular HS-SCCH operation or HS-SCCH less operation. For regular HS-SCCH operation, control information is sent to the UE on the HS-SCCH two slots prior to transmission of a transport block on the HS-PDSCH. The UE may monitor the HS-SCCH to determine whether control information has been sent to the UE and may process the HS-PDSCH upon receiving control information on the HS-SCCH. For HS-SCCH less operation, control information is not sent to the UE on the HS-SCCH prior to transmission of a transport block on the HS-PDSCH. The UE may be preconfigured with a set of parameters, e.g., one or more 16-chip OVSF codes, one or more transport block sizes, etc. The UE may blindly decode the HS-PDSCH based on the preconfigured parameters to determine whether or not data has been sent to the UE. For both regular HS-SCCH operation and HS-SCCH less operation, control information may be sent prior to a retransmission of a transport block to the UE.

Figure 2A:
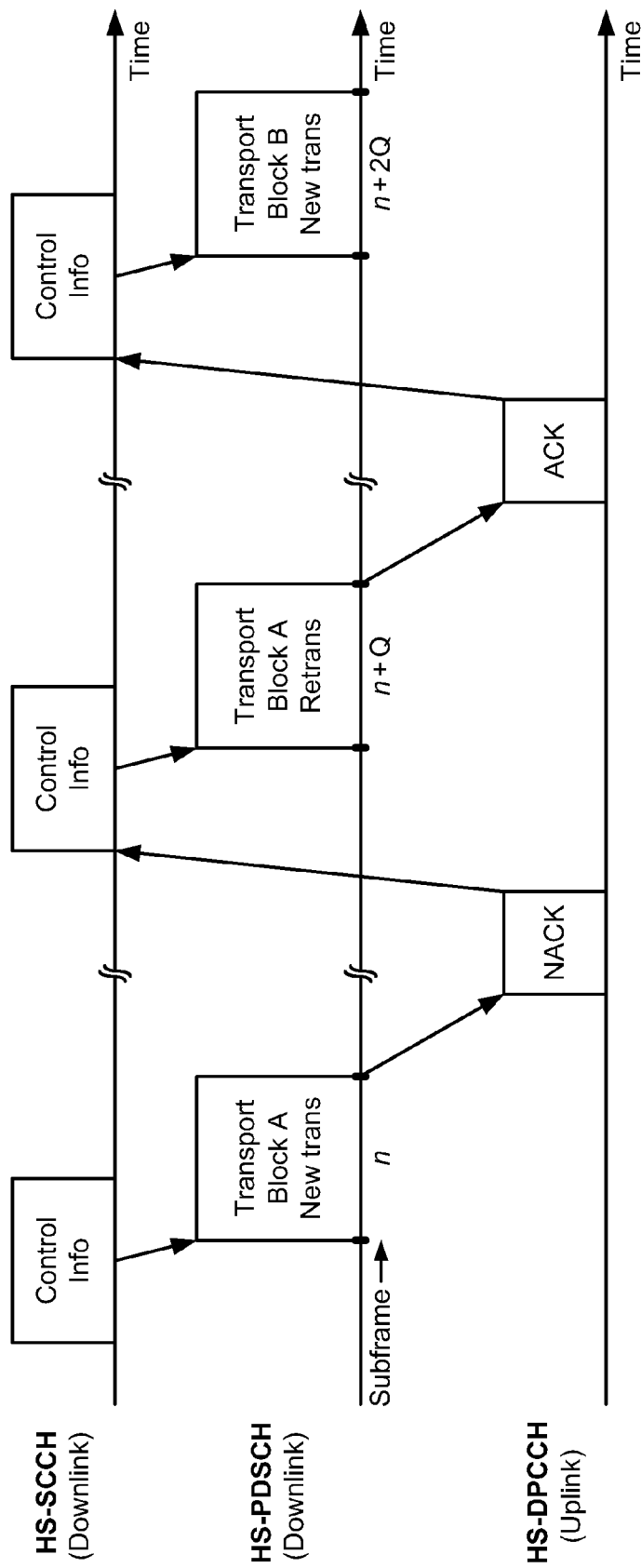
FIG. 2A shows data transmission with regular HS-SCCH operation.

FIG. 2A shows data transmission with regular HS-SCCH operation. A Node B may have data to send to a UE and may schedule the UE for downlink transmission. The Node B may send control information for the UE on the HS-SCCH and may send a new transmission of a transport block for the UE on the HS-PDSCH. The data transmission on the HS-PDSCH is delayed by two slots from the corresponding control transmission on the HS-SCCH.

The UE may process the HS-SCCH and recover the control information sent to the UE. The UE may then process the HS-PDSCH based on the control information to recover the transport block sent to the UE. The UE may send an ACK on the HS-DPCCH if the transport block is decoded correctly or a NACK otherwise. The UE may also send a channel quality indicator (CQI) along with the ACK or NACK on the HS-DPCCH (not shown in FIG. 2A).

The Node B may receive the signaling from the UE. The Node B may send a retransmission of the transport block if a NACK is received and send a new transmission for another transport block if an ACK is received. The Node B may send control information on the HS-SCCH and either the retransmission or new transmission on the HS-PDSCH. The control information may indicate whether the HS-PDSCH carries a retransmission or a new transmission as well as other information.

Figure 2B:
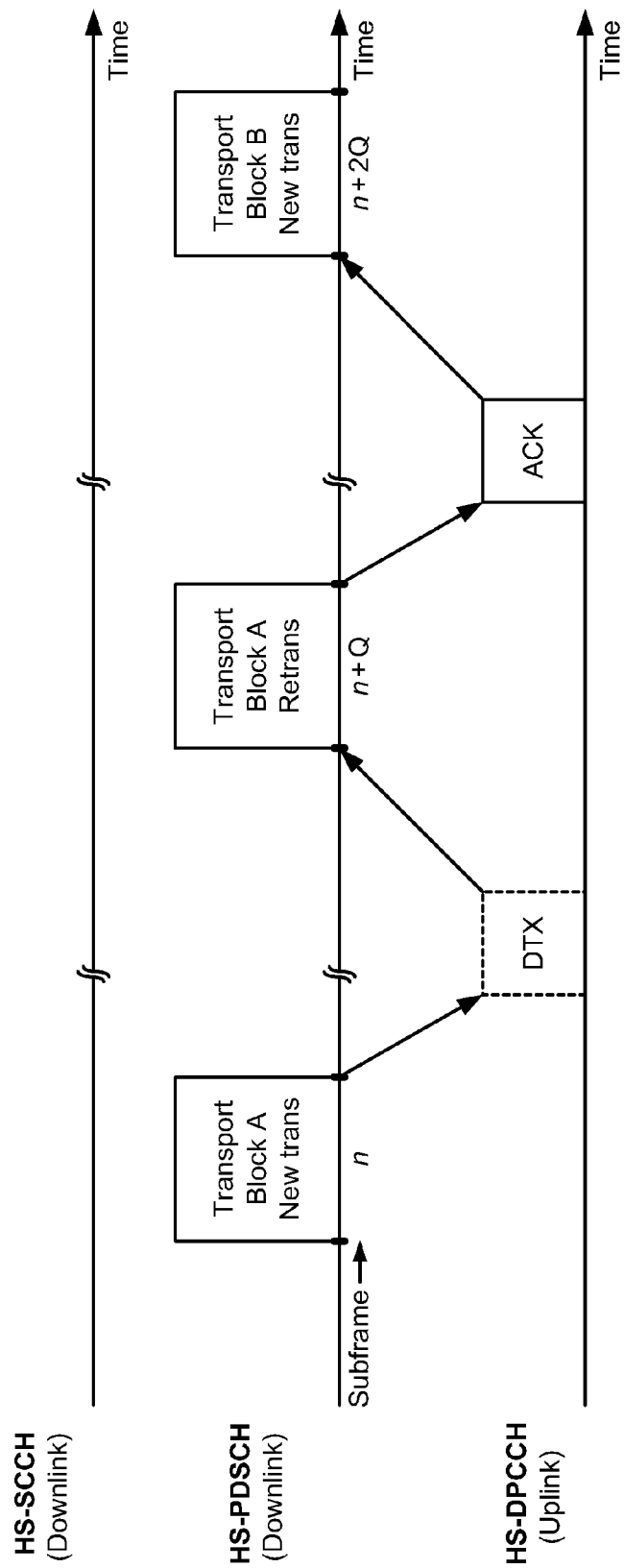
FIG. 2B shows data transmission with HS-SCCH less operation.

FIG. 2B shows data transmission with HS-SCCH less operation. A Node B may have data to send to a UE and may schedule the UE for downlink transmission. The Node B may process a transport block based on preconfigured parameters for the UE. The Node B may send a new transmission of the transport block on the HS-PDSCH to the UE and may send no control information on the HS-SCCH. The UE may blindly decode the HS-PDSCH based on the preconfigured parameters to recover the transport block sent to the UE. The UE may send an ACK on the HS-DPCCH if the transport block is decoded correctly and may send nothing/DTX if no transport block is decoded correctly based on the preconfigured parameters. The UE may also send CQI along with the ACK/DTX on the HS-DPCCH. The Node B may send a retransmission if DTX is received from the UE and may send a new transmission for another transport block if an ACK is received.

Table 2 summaries several key features of regular HS-SCCH operation and HS-SCCH less operation. In the description below, "regular" HSDPA transmissions are transmissions sent with regular HS-SCCH operation, and "new" HSDPA transmissions are transmissions sent with HS-SCCH less operation. For regular HS-SCCH operation, a UE may send a ternary indication for ACK, NACK or DTX for HARQ feedback. For HS-SCCH less operation, the UE may send an OOK indication for ACK or DTX for HARQ feedback and can thus only positively acknowledge a transmission that is decoded correctly.

TABLE 2

| Operating Mode | Control Information | Transmission | HARQ Feedback |
| --- | --- | --- | --- |
| Regular HS-SCCH operation | Control information sent on the HS-SCCH | Regular HSDPA transmissions | ACK, NACK or DTX |
| HS-SCCH less operation | No control information sent on the HS-SCCH | New HSDPA transmissions | ACK or DTX |

A Node B may dynamically switch from HS-SCCH less operation to regular HS-SCCH operation for retransmission of a transport block or to transmit a larger payload to a UE operating in a HS-SCCH less mode or a DTX-DRX mode. The Node B may dynamically send regular HSDPA transmissions as well as new HSDPA transmissions to the UE. The regular HSDPA transmissions may be for retransmissions of transport blocks decoded in error or new transmissions of transport blocks and may be sent on the HS-SCCH and HS-DSCH. The new HSDPA transmissions may be for new transmissions sent on the HS-DSCH and/or HS-SCCH orders sent on the HS-SCCH.

The UE may dynamically receive regular HSDPA transmissions as well as new HSDPA transmissions from the Node B. The UE may send ternary indications for HARQ feedback for the regular HSDPA transmissions and may send OOK indications for HARQ feedback for the new HSDPA transmissions. The UE may transmit ACK at the same power level for both new and regular HSDPA transmissions. However, this may significantly reduce the reliability of the ACK for the new HSDPA transmissions.

Figure 3A:
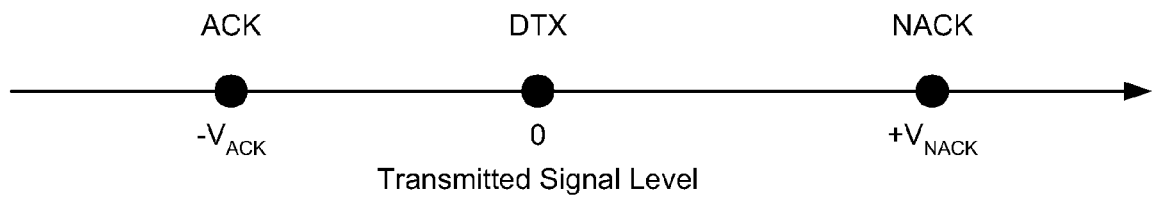
FIG. 3A shows a signal constellation for ternary indications.

FIG. 3A shows an example signal constellation for the ternary indications for regular HS-SCCH operation. The horizontal axis represents signal level. In this example, an ACK may be sent with a signal value of $-V_{ACK}$, a NACK may be sent with a signal value of $+V_{NACK}$, and a DTX may be sent with a signal value of zero. The power level of ACK may be given as $P_{ACK}=V_{ACK}^2$, and the power level of NACK may be given as $P_{NACK}=V_{NACK}^2$.

The ACK power level $P_{ACK}$ may be given by a power offset $\Delta_{ACK}$, and the NACK power level $P_{NACK}$ may be given by a power offset $\Delta_{NACK}$. The power offsets $\Delta_{ACK}$ and $\Delta_{NACK}$ may be signaled by higher layers to the UE and may provide the $P_{ACK}$ and $P_{NACK}$ power levels relative to the power level of a Dedicated Physical Control Channel (DPCCH). The $P_{ACK}$ and $P_{NACK}$ power levels may thus be determined based on the known power level of the DPCCH (which may be adjusted via power control) and the signaled power offsets $\Delta_{ACK}$ and $\Delta_{NACK}$ (which may be static values). Signal value, power level, and power offset may provide comparable or equivalent information and may be used interchangeably.

Figure 3B:
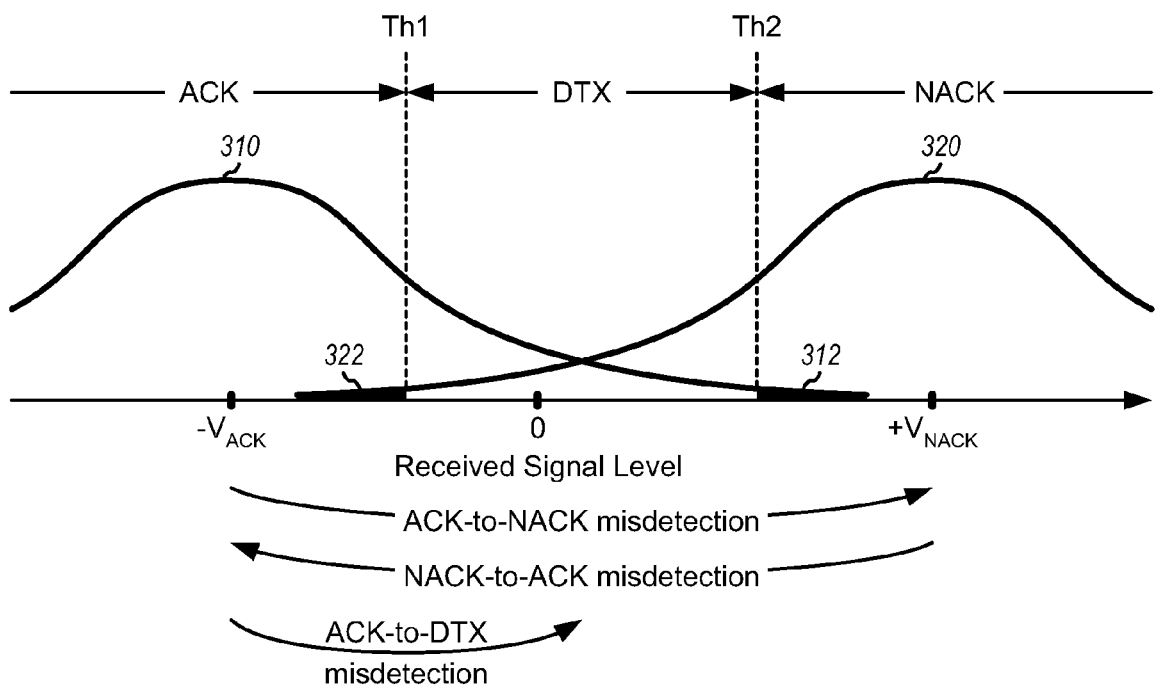
FIG. 3B shows PDFs of ACK and NACK sent with ternary indications.

FIG. 3B shows probability density functions (PDFs) of ACK and NACK for regular HS-SCCH operation. The ACK and NACK may be transmitted at signal values of $-V_{ACK}$ and $+V_{NACK}$, respectively. However, due to noise and distortion in a communication channel, the received values for the ACK and NACK may be different from the transmitted values. A plot 310 shows the PDF of the ACK, which may resemble a Gaussian distribution centered at the nominal value of $-V_{ACK}$. A plot 320 shows the PDF of the NACK, which may resemble a Gaussian distribution centered at the nominal value of $+V_{NACK}$.

Two thresholds Th1 and Th2 may be used to detect a received ternary value. An ACK may be declared if the received ternary value is less than the Th1 threshold. A NACK may be declared if the received ternary value is greater than the Th2 threshold. A DTX may be declared if the received ternary value is between the Th1 and Th2 thresholds.

ACK-to-NACK misdetection is detection of a NACK when an ACK is transmitted. The ACK-to-NACK misdetection probability is determined by an area 312, which is under plot 310 and to the right of the Th2 threshold. NACK-to-ACK misdetection is detection of an ACK when a NACK is transmitted. The NACK-to-ACK misdetection probability is determined by an area 322, which is under plot 320 and to the left of the Th1 threshold.

An ACK-to-NACK misdetection may result in retransmission of a transport block that was decoded correctly, which would consume additional system resources. A NACK-to-ACK misdetection may result in termination of a transport block that was decoded in error, which may cause more problematic errors. ACK-to-NACK and NACK-to-ACK misdetections may thus have different system impacts. A design target for ACK-to-NACK misdetection may be on the order of $10^{-3}$ whereas a design target for NACK-to-ACK misdetection may be on the order of $10^{-4}$. The target ACK-to-NACK and NACK-to-ACK misdetection probabilities may be achieved by selecting appropriate power offsets for ACK and NACK. The DTX-to-ACK and DTX-to-NACK misdetections may be less important to minimize since they may cause system degradation only when the UE misses the control information sent on the HS-SCCH.

Figure 4A:
FIG. 4A shows a signal constellation for OOK indications.

FIG. 4A shows an example signal constellation for the OOK indications for HS-SCCH less operation. In this example, a DTX or NACK may be sent with a signal value of zero, and an ACK may be sent with a signal value of $-V_{ACK}$, which is the same signal value used for an ACK for regular HS-SCCH operation.

Figure 4B:
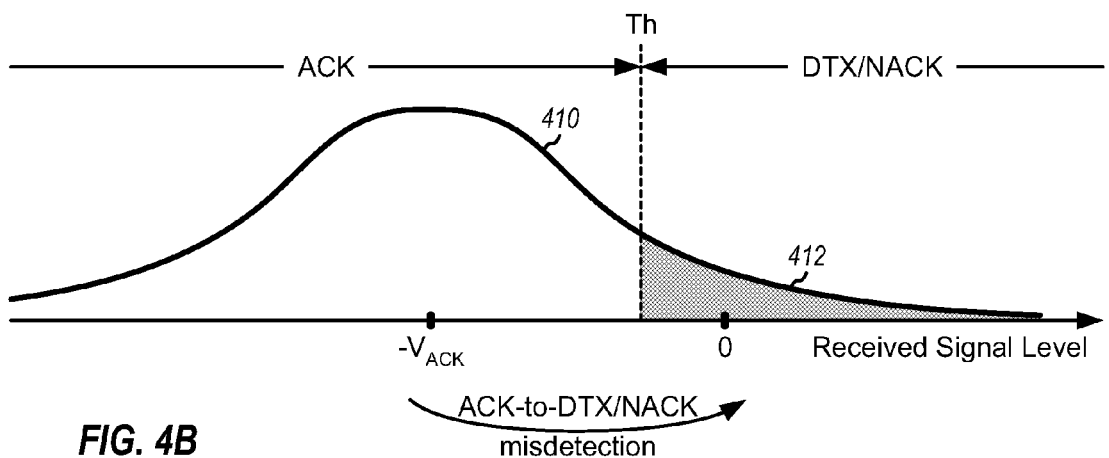
FIG. 4B shows a PDF of ACK sent with an OOK indication.

FIG. 4B shows a plot 410 of a PDF of ACK for HS-SCCH less operation. Plot 410 may be the same as plot 310 in FIG. 3A and may resemble a Gaussian distribution centered at the nominal value of $-V_{ACK}$.

One threshold Th may be used to detect a received OOK value. An ACK may be declared if the received OOK value is less than the Th threshold. A DTX/NACK may be declared if the received OOK value is greater than the Th threshold. The ACK-to-DTX/NACK misdetection probability is determined by an area 412, which is under plot 410 and to the right of the Th threshold.

DTX for HS-SCCH less operation effectively represents both DTX and NACK since NACK is not sent. Thus, if the Th threshold in FIG. 4B is equal to the Th1 threshold in FIG. 3B, then the ACK-to-NACK misdetection probability for HS-SCCH less operation (area 412) may be equivalent to the ACK-to-DTX misdetection probability for regular HS-SCCH operation, which may be much greater than the ACK-to-NACK misdetection probability for regular HS-SCCH operation (area 312). The higher ACK-to-NACK misdetection probability for HS-SCCH less operation due to the use of the same power offset $\Delta_{ACK}$ may adversely impact system performance.

In an aspect, different power levels may be used for ACK for regular HS-SCCH operation and HS-SCCH less operation. These power levels may be selected to achieve the desired ACK-to-NACK misdetection probabilities for both regular HS-SCCH operation and HS-SCCH less operation.

Figure 5A:
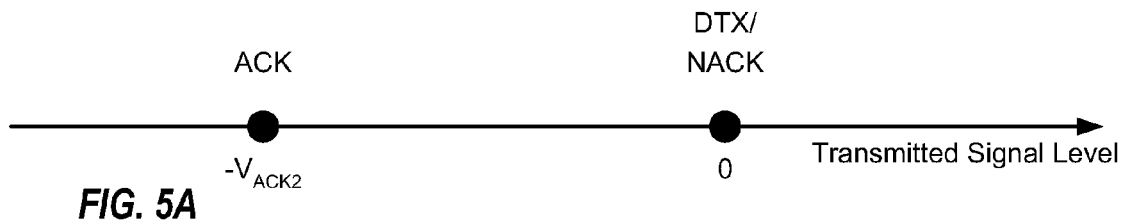
FIG. 5A shows a signal constellation for OOK indications with higher power level for ACK.

FIG. 5A shows an example signal constellation with higher power level for ACK for HS-SCCH less operation. In this example, a DTX or NACK may be sent with a signal value of zero, and an ACK may be sent with a signal value of $-V_{ACK2}$, which may have a larger magnitude than that of the signal value $-V_{ACK}$ used for an ACK for regular HS-SCCH operation. The power level of ACK for HS-SCCH less operation may be given as $P_{ACK2}=V_{ACK}^2$ and may be associated with a power offset of $\Delta_{ACK2}$.

Figure 5B:
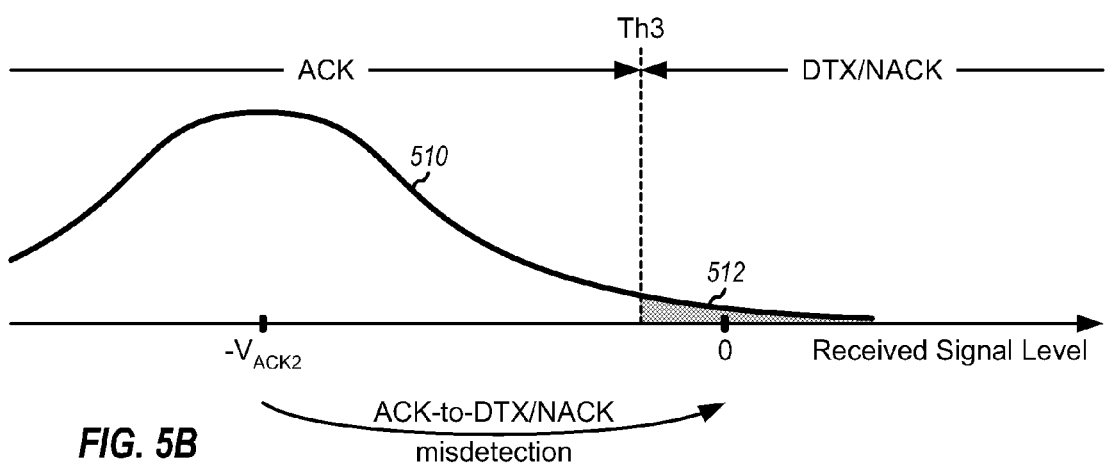
FIG. 5B shows a PDF of ACK sent with an OOK indication at higher power level.

FIG. 5B shows a plot 510 of a PDF of ACK for HS-SCCH less operation. Plot 510 may resemble a Gaussian distribution centered at the nominal value of $-V_{ACK2}$. Plot 510 may be shifted to the left relative to plot 410 in FIG. 4A, with the amount of shift being determined by the magnitude of $V_{ACK2}$ in comparison to the magnitude of $V_{ACK}$.

One threshold Th3 may be used to detect a received OOK value. An ACK may be declared if the received OOK value is less than the Th3 threshold. A DTX may be declared if the received OOK value is greater than the Th3 threshold. The ACK-to-DTX/NACK misdetection probability is determined by an area 512, which is under plot 510 and to the right of the Th3 threshold. As shown in FIG. 5B, the desired ACK-to-NACK misdetection probability may be obtained by selecting a suitable value of $V_{ACK2}$ and a suitable Th3 threshold.

The $P_{ACK2}$ power level for ACK in HS-SCCH less operation may be determined or selected in various manners. In one design, the $P_{ACK2}$ power level may be selected based on the target ACK-to-DTX/NACK misdetection probability for HS-SCCH less operation and may be selected independently of the $P_{ACK}$ and $P_{NACK}$ power levels for regular HS-SCCH operation. The $P_{ACK2}$ power level may be selected by a network entity and provided to the UE. For example, RNC 130 in FIG. 1 may select the $P_{ACK2}$ power level and provide the selected power level as a separate power offset $\Delta_{ACK2}$ or $ACK_{hs-scch-less}$ to the UE via higher layer Radio Resource Control (RRC) signaling.

In another design, the $P_{NACK}$ power level for NACK in regular HS-SCCH operation (which is higher than the $P_{ACK}$ power level for ACK in regular HS-SCCH operation) may be used for ACK in HS-SCCH less operation. For this design, $P_{ACK2}=P_{NACK}$, and the power level for ACK in HS-SCCH less operation does not need to be sent to the UE. This design may reduce RRC signaling overhead.

In yet another design, the $P_{ACK2}$ power level for ACK in HS-SCCH less operation is a scaled version of either the $P_{ACK}$ power level for ACK or the $P_{NACK}$ power level for NACK in regular HS-SCCH operation. In this design, $P_{ACK2}$ may be equal to $\alpha \cdot P_{ACK}$ or $\alpha \cdot P_{NACK}$, where $\alpha$ is a scaling factor. The scaling factor $\alpha$ may be a fixed value known in advance by the UE and does not need to be signaled. Alternatively, the scaling factor $\alpha$ may be a configurable value that may be signaled to the UE.

In yet another design, the $P_{ACK2}$ power level for ACK in HS-SCCH less operation may be determined based on both the $P_{ACK}$ power level for ACK and the $P_{NACK}$ power level for NACK in regular HS-SCCH operation. In this design, the $P_{ACK2}$ power level may be expressed as:

$$P_{ACK2}=\beta_1 \cdot P_{ACK}+\beta_2 \cdot P_{NACK},\quad \text{Eq (1)}$$

where $\beta_1$ and $\beta_2$ are scaling factors for $P_{ACK}$ and $P_{NACK}$ power levels, respectively. If $\beta_1=\beta_2=1$, then $P_{ACK2}=P_{ACK}+P_{NACK}$, and the ACK-to-DTX/NACK misdetection probability for HS-SCCH less operation would be as good as or better than the ACK-to-NACK misdetection probability for regular HS-SCCH operation.

The $P_{ACK2}$ power level for ACK in HS-SCCH less operation may also be determined in other manners for other designs. The $P_{ACK2}$ power level for ACK in HS-SCCH less operation may be different from the $P_{ACK}$ power level for ACK in regular HS-SCCH operation in order to achieve the target ACK-to-DTX/NACK misdetection probability for HS-SCCH less operation.

The techniques described herein may provide certain advantages. The techniques may ensure comparable service quality for both regular HS-SCCH operation and HS-SCCH less operation. The techniques may ensure that the HARQ feedback error rate for HS-SCCH less operation is comparable to the HARQ feedback error rate for regular HS-SCCH operation. In this case, the likelihood of retransmission for a new HSDPA transmission in HS-SCCH less operation may be comparable to the likelihood of retransmission for a regular HSDPA transmission in regular HS-SCCH operation. The comparable HARQ feedback error rates for new and regular HSDPA transmissions may ensure comparable cell edge performance and comparable effective coverage for different types of service. For example, a Voice-over-Internet Protocol (VoIP) call using HS-SCCH less operation should have comparable coverage as a regular VoIP call using regular HS-SCCH operation, and this may be achieved with the techniques described herein.

The techniques described herein may also ensure that capacity gain achieved with HS-SCCH less operation is not overly diminished due to excessive ACK-to-DTX/NACK misdetections. A typical implementation of HARQ on the downlink may target a high first transmission success rate, e.g., on the order of 90%. A higher ACK-to-DTX/NACK misdetection probability would reduce the first transmission success rate. It may be desirable to maintain or improve the performance of the first transmissions in HS-SCCH less operation because subsequent retransmissions utilize the HS-SCCH, which would then reduce the capacity benefit achieved by HS-SCCH less operation. The techniques described herein may ensure that the target first transmission success rate is not degraded by excessive ACK-to-DTX/NACK misdetections.

For clarity, certain aspects of the techniques have been described for transmission of ACK for HARQ in HSDPA. The techniques may be used to send ACK for data transmissions sent on the HS-DSCH, for ACK for HS-SCCH orders sent on the HS-SCCH, for ACK for data and/or signaling sent for Continuous Packet Connectivity (CPC) in UMTS, and for ACK sent for other transmissions sent on other data and control channels. The techniques may also be used for other types of signaling besides ACK. For example, the techniques may be used for power control bits, other indicators, etc. The techniques may also be used for other combinations of modulation schemes besides ternary and OOK. Thus, while specific designs have been described using WCDMA and HSDPA, it will be apparent to one skilled in the art that the techniques can be applied to any communication system to improve the reliability of signaling.

Figure 6:
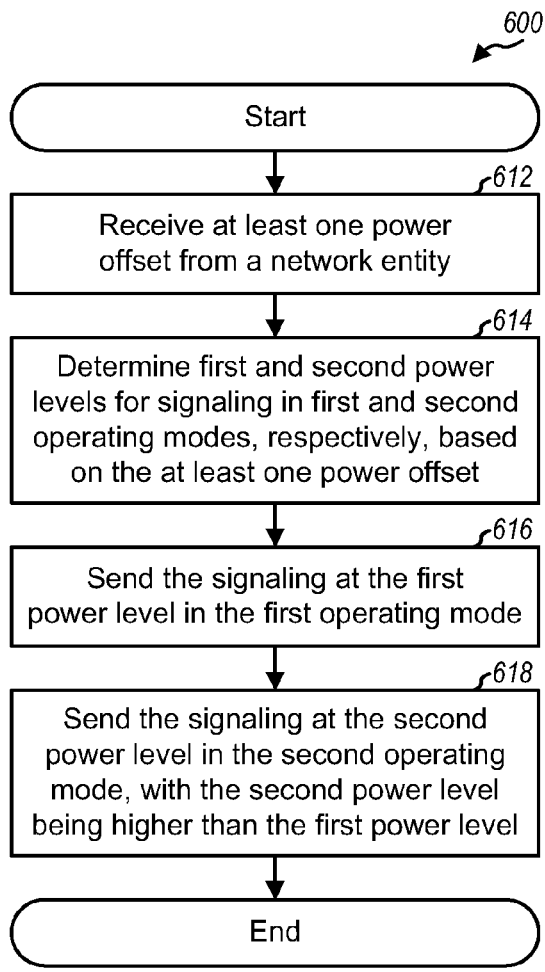
FIG. 6 shows a process for transmitting signaling.

FIG. 6 shows a design of a process 600 performed by a UE or some other entity to transmit signaling. The UE may receive at least one power offset from a network entity (block 612). The UE may determine first and second power levels for signaling in first and second operating modes, respectively, based on the at least one power offset (block 614). The UE may send the signaling at the first power level in the first operating mode (block 616). The UE may send the signaling at the second power level in the second operating mode, with the second power level being higher than the first power level (block 618). The UE may send the signaling (i) with a ternary indication for one of three possible signal values in the first operating mode and (ii) with an OOK indication for one of two possible signal values in the second operating mode. The signaling may comprise ACK. The UE may send ACK, NACK and DTX with ternary indications in the first operating mode. The UE may send ACK and DTX with OOK indications in the second operating mode.

In one design of blocks 612 and 614, the UE may receive first and second power offsets for the signaling in the first and second operating modes, respectively. The UE may determine the first and second power levels based on the first and second power offsets, respectively. In another design, the UE may receive a power offset for the signaling in the first operating mode and may determine the first and second power levels based on the power offset. In yet another design, the UE may receive a first power offset for ACK and a second power offset for NACK in the first operating mode. The UE may determine the first power level for ACK in the first operating mode based on the first power offset and may determine the second power level for ACK in the second operating mode based on the first and/or second power offset. The UE may also determine the first and second power levels in other manners and/or based on other information.

The first operating mode may correspond to the regular HS-SCCH mode, and the second operating mode may correspond to the HS-SCCH less mode in UMTS. The UE may receive control information with data transmission in the first operating mode and may receive no control information with data transmission in the second operating mode.

Figure 7:
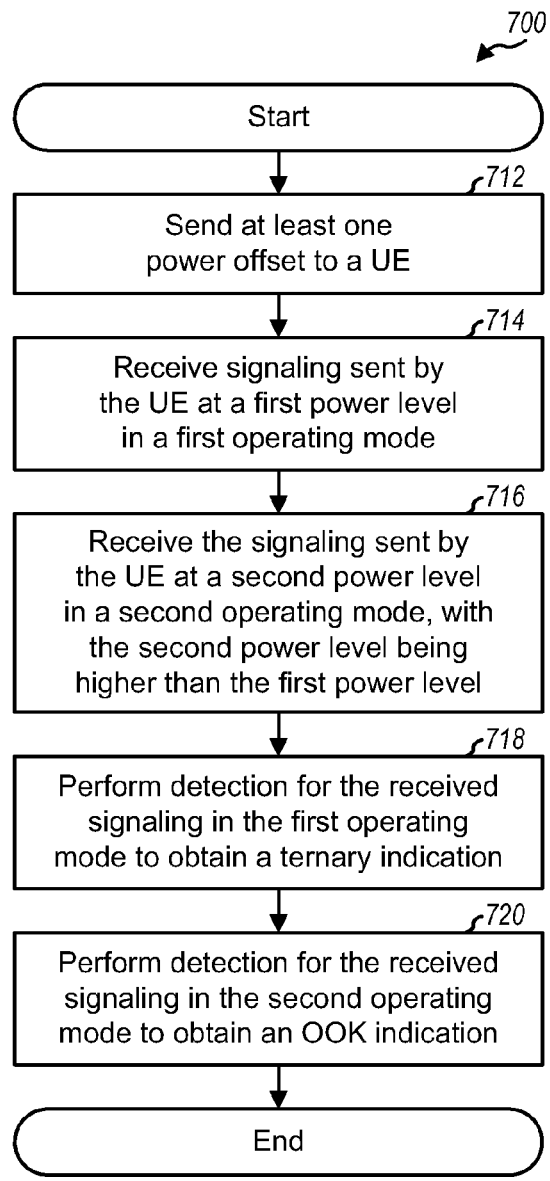
FIG. 7 shows a process for receiving signaling.

FIG. 7 shows a design of a process 700 performed by a Node B or some other entity to receive signaling. The Node B may send at least one power offset to a UE (block 712). The Node B may receive signaling sent by the UE at a first power level in a first operating mode (block 714). The Node B may receive the signaling sent by the UE at a second power level in a second operating mode, with the second power level being higher than the first power level (block 716). In one design, different modulation schemes may be used for the first and second operating modes. The Node B may perform detection for the received signaling in the first operating mode to obtain a ternary indication (block 718). The Node B may perform detection for the received signaling in the second operating mode to obtain an OOK indication (block 720).

In one design, the signaling may comprise ACK. The Node B may process the received signaling in the first operating mode to detect for one of three signal values corresponding to ACK, NACK and DTX. The Node B may process the received signaling in the second operating mode to detect for one of two signal values corresponding to ACK and DTX.

In one design of block 712, the Node B may send first and second power offsets for the signaling in the first and second operating modes, respectively, to the UE. The first and second power levels may be determined based on the first and second power offsets, respectively. In another design, the Node B may send a power offset for the signaling in the first operating mode. The first and second power levels may be determined based on the power offset. In yet another design, the Node B may send a first power offset for ACK and a second power offset for NACK in the first operating mode. The first and second power levels may be determined based on the first and second power offsets, respectively. The Node B may also send other information used to determine the first and second power levels.

Figure 8:
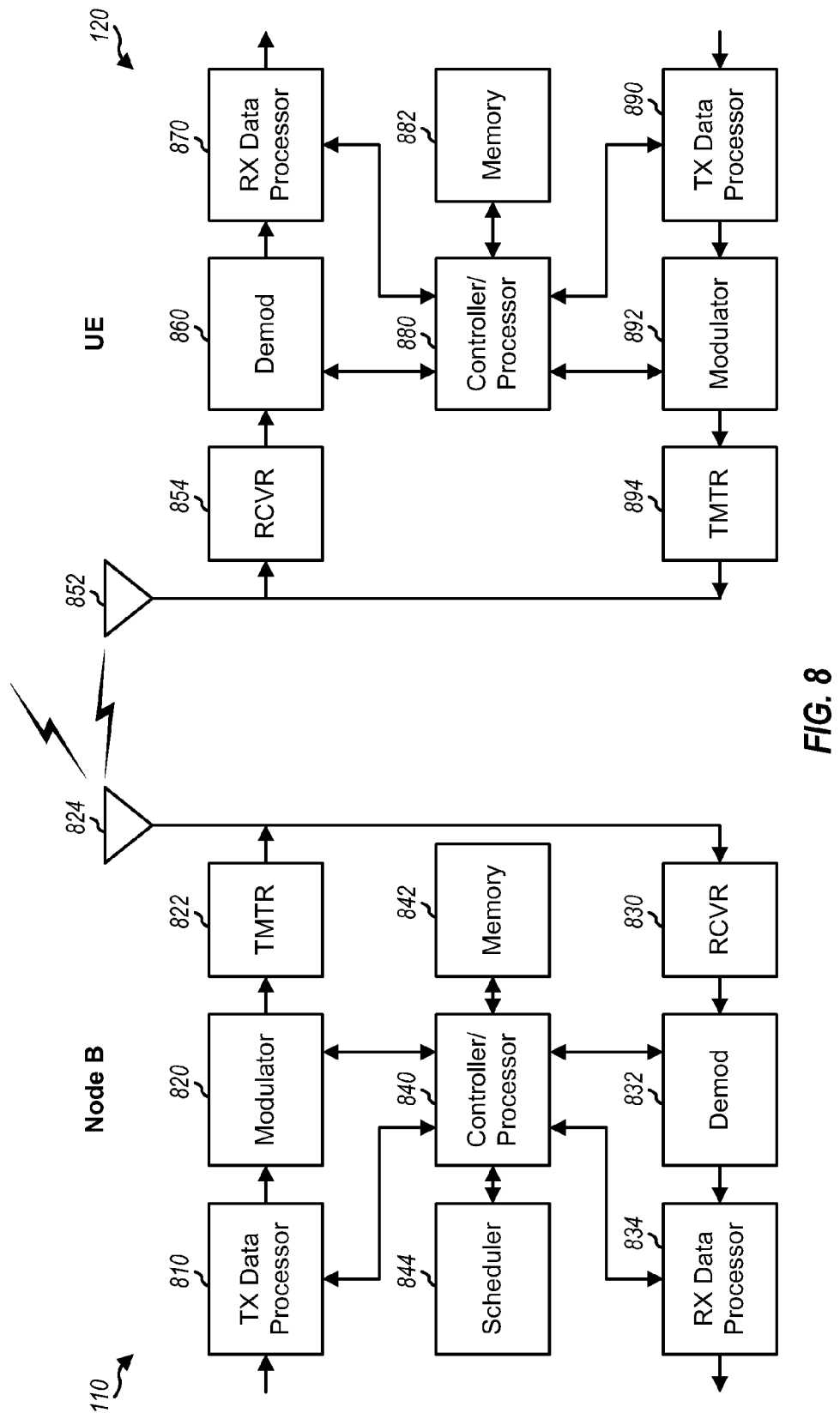
FIG. 8 shows a block diagram of a Node B and a UE.

FIG. 8 shows a block diagram of a design of a Node B 110 and a UE 120, which are one of the Node Bs and one of the UEs in FIG. 1. At Node B 110, a transmit (TX) data processor 810 receives traffic data from a data source (not shown) and control information from a controller/processor 840, processes (e.g., encodes, interleaves, and symbol maps) the traffic data and control information, and provides data symbols and control symbols. The control information may comprise information sent on the HS-SCCH for regular HS-SCCH operation, one or more power offsets for ACK and/or NACK in regular HS-SCCH operation and/or HS-SCCH less operation, etc. A modulator 820 processes the data and control symbols as specified by the system and provides output chips. A transmitter (TMTR) 822 processes (e.g., converts to analog, amplifies, filters, and frequency upconverts) the output chips and generates a downlink signal, which is transmitted via an antenna 824.

At UE 120, an antenna 852 receives the downlink signal from Node B 110 and provides a received signal to a receiver (RCVR) 854. Receiver 854 conditions (e.g., filters, amplifies, frequency downconverts, and digitizes) the received signal and provides received samples. A demodulator (Demod) 860 processes the received samples in a manner complementary to the processing by modulator 820 and provides symbol estimates. A receive (RX) data processor 870 processes (e.g., symbol demaps, deinterleaves, and decodes) the symbol estimates and provides decoded data and control information for UE 110.

On the uplink, at UE 120, traffic data and signaling (e.g., ACK, NACK and/or DTX) are processed by a TX data processor 890, modulated by a modulator 892, conditioned by a transmitter 894, and transmitted via antenna 852. ACK for new HARQ transmissions in HS-SCCH less operation may be sent at different (e.g., higher) power level than ACK for regular HARQ transmissions in regular HS-SCCH operation. At Node B 110, the uplink signals from UE 120 and other UEs are received by antenna 824, conditioned by a receiver 830, demodulated by a demodulator 832, and processed by an RX data processor 834 to recover data and signaling sent by the UEs. In general, the processing for uplink transmission may be similar to, or different from, the processing for downlink transmission.

Controllers 840 and 880 direct the operations at Node B 110 and UE 120, respectively. Memories 842 and 882 store data and program codes for Node B 110 and UE 120, respectively. A scheduler 844 schedules UEs for downlink and/or uplink transmission, e.g., based on signaling received from the UEs.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. An apparatus for wireless communication, comprising: at least one processor configured to send signaling at a first power level in a regular HS-SCCH operating mode, and to send the signaling at a second power level in an HS-SCCH less operating mode, the second power level being higher than the first power level; and a memory coupled to the at least one processor.

2. The apparatus of claim 1, wherein the signaling comprises acknowledgement (ACK), and wherein the at least one processor is configured to send ACK at the first power level in the regular HS-SCCH operating mode, and to send ACK at the second power level in the HS-SCCH less operating mode.

3. The apparatus of claim 2, wherein the at least one processor is configured to send ACK with one of three possible signal values in the regular HS-SCCH operating mode, and to send ACK with one of two possible signal values in the HS-SCCH less operating mode.

4. The apparatus of claim 1, wherein the at least one processor is configured to send the signaling with a ternary indication at the first power level in the regular HS-SCCH operating mode, and to send the signaling with an on/off keying (OOK) indication at the second power level in the HS-SCCH less operating mode.

5. The apparatus of claim 1, wherein the signaling comprises acknowledgement (ACK), and wherein the at least one processor is configured to send ACK, negative acknowledgement (NACK), and discontinuous transmission (DTX) with ternary indications in the regular HS-SCCH operating mode, and to send ACK and DTX with on/off keying (OOK) indications in the HS-SCCH less operating mode.

6. The apparatus of claim 1, wherein the at least one processor is configured to receive first and second power offsets from a network entity, to determine the first power level based on the first power offset, and to determine the second power level based on the second power offset.

7. The apparatus of claim 1, wherein the at least one processor is configured to receive a power offset for the signaling in the regular HS-SCCH operating mode from a network entity, and to determine the first and second power levels based on the power offset.

8. The apparatus of claim 1, wherein the at least one processor is configured to receive a power offset for acknowledgement (ACK) and a second power offset for negative acknowledgement (NACK) in the regular HS-SCCH operating mode, to determine the first power level based on the first power offset, to determine the second power level based on the second power offset, to send ACK at the first power level in the regular HS-SCCH operating mode, and to send ACK at the second power level in the HS-SCCH less operating mode.

9. The apparatus of claim 8, wherein the at least one processor is configured to determine a third power level for NACK based on the second power offset, and to set the second power level equal to the third power level.

10. The apparatus of claim 8, wherein the at least one processor is configured to determine the second power level based further on the first power offset.

11. The apparatus of claim 1, wherein the at least one processor is configured to receive control information with data transmission in the regular HS-SCCH operating mode, to send the signaling for the received data transmission in the regular HS-SCCH operating mode at the first power level, to receive no control information with data transmission in the HS-SCCH less operating mode, and to send the signaling for the received data transmission in the HS-SCCH less operating mode at the second power level.

12. A method for wireless communication, comprising:
sending signaling at a first power level in a regular HS-SCCH operating mode; and
sending the signaling at a second power level in an HS-SCCH less operating mode, the second power level being higher than the first power level.

13. The method of claim 12, wherein the sending the signaling at the first power level comprises sending the signaling with a ternary indication at the first power level in the regular HS-SCCH operating mode, and wherein the sending the signaling at the second power level comprises sending the signaling with an on/off keying (OOK) indication at the second power level in the HS-SCCH less operating mode.

14. The method of claim 12, wherein the signaling comprises acknowledgement (ACK), wherein the sending the signaling at the first power level comprises sending ACK with one of three possible signal values at the first power level in the regular HS-SCCH operating mode, and wherein the sending the signaling at the second power level comprises sending ACK with one of two possible signal values at the second power level in the HS-SCCH less operating mode.

15. The method of claim 12, further comprising:
receiving a first power offset for acknowledgement (ACK) and a second power offset for negative acknowledgement (NACK) in the regular HS-SCCH operating mode;
determining the first power level based on the first power offset; and
determining the second power level based on the second power offset.

16. An apparatus for wireless communication, comprising:
means for sending signaling at a first power level in a regular HS-SCCH operating mode; and
means for sending the signaling at a second power level in an HS-SCCH less operating mode, the second power level being higher than the first power level.

17. The apparatus of claim 16, wherein the means for sending the signaling at the first power level comprises means for sending the signaling with a ternary indication at the first power level in the regular HS-SCCH operating mode, and wherein the means for sending the signaling at the second power level comprises means for sending the signaling with an on/off keying (OOK) indication at the second power level in the HS-SCCH less operating mode.

18. The apparatus of claim 16, wherein the signaling comprises acknowledgement (ACK), wherein the means for sending the signaling at the first power level comprises means for sending ACK with one of three possible signal values at the first power level in the regular HS-SCCH operating mode, and wherein the means for sending the signaling at the second power level comprises means for sending ACK with one of two possible signal values at the second power level in the HS-SCCH less operating mode.

19. The apparatus of claim 16, further comprising:
means for receiving a first power offset for acknowledgement (ACK) and a second power offset for negative acknowledgement (NACK) in the regular HS-SCCH operating mode;
means for determining the first power level based on the first power offset; and
means for determining the second power level based on the second power offset.

20. A computer-readable medium comprising code, which, when executed by a processor, causes the processor to perform operations for wireless communication, the computer-readable medium comprising:
code for causing at least one computer to send signaling at a first power level in a regular HS-SCCH operating mode; and
code for causing the at least one computer to send the signaling at a second power level in an HS-SCCH less operating mode, the second power level being higher than the first power level.

21. The computer program product of claim 20, wherein the computer-readable medium further comprises:
code for causing the at least one computer to send the signaling with a ternary indication at the first power level in the regular HS-SCCH operating mode; and
code for causing the at least one computer to send the signaling with an on/off keying (OOK) indication at the second power level in the HS-SCCH less operating mode.

22. The computer program product of claim 20, wherein the signaling comprises acknowledgement (ACK), and wherein the computer-readable medium further comprises:
code for causing the at least one computer to send ACK with one of three possible signal values at the first power level in the regular HS-SCCH operating mode; and
code for causing the at least one computer to send ACK with one of two possible signal values at the second power level in the HS-SCCH less operating mode.

23. The computer program product of claim 20, wherein the computer-readable medium further comprises:
code for causing the at least one computer to receive a first power offset for acknowledgement (ACK) and a second power offset for negative acknowledgement (NACK) in the regular HS-SCCH operating mode;
code for causing the at least one computer to determine the first power level based on the first power offset; and
code for causing the at least one computer to determine the second power level based on the second power offset.

24. An apparatus for wireless communication, comprising:
at least one processor configured to receive signaling sent by a user equipment (UE) at a first power level in a regular HS-SCCH operating mode, and to receive the signaling sent by the UE at a second power level in an HS-SCCH less operating mode, the second power level being higher than the first power level; and
a memory coupled to the at least one processor.

25. The apparatus of claim 24, wherein the at least one processor is configured to perform detection for the received signaling in the regular HS-SCCH operating mode to obtain a ternary indication sent by the UE, and to perform detection for the received signaling in the HS-SCCH less operating mode to obtain an on/off keying (OOK) indication sent by the UE.

26. The apparatus of claim 24, wherein the at least one processor is configured to process the received signaling in the regular HS-SCCH operating mode to detect for one of three signal values corresponding to acknowledgement (ACK), negative acknowledgement (NACK), and discontinuous transmission (DTX), and to process the received signaling in the HS-SCCH less operating mode to detect for one of two signal values corresponding to ACK and DTX.

27. The apparatus of claim 24, wherein the at least one processor is configured to send first and second power offsets to the UE, and wherein the first and second power levels are determined based on the first and second power offsets, respectively.

28. The apparatus of claim 24, wherein the at least one processor is configured to send a power offset for the signaling in the regular HS-SCCH operating mode to the UE, and wherein the first and second power levels are determined based on the power offset.

29. The apparatus of claim 24, wherein the at least one processor is configured to send a first power offset for acknowledgement (ACK) and a second power offset for negative acknowledgement (NACK) in the regular HS-SCCH operating mode to the UE, to receive ACK sent by the UE at the first power level in the regular HS-SCCH operating mode, and to receive ACK sent by the UE at the second power level in the HS-SCCH less operating mode, the first and second power levels being determined based on the first and second power offsets, respectively.

30. A method for wireless communication, comprising:
receiving signaling sent by a user equipment (UE) at a first power level in a regular HS-SCCH operating mode; and
receiving the signaling sent by the UE at a second power level in an HS-SCCH less operating mode, the second power level being higher than the first power level.

31. The method of claim 30, further comprising:
performing detection for the received signaling in the regular HS-SCCH operating mode to obtain a ternary indication sent by the UE; and
performing detection for the received signaling in the HS-SCCH less operating mode to obtain an on/off keying (OOK) indication sent by the UE.

32. The method of claim 30, further comprising:
processing the received signaling in the regular HS-SCCH operating mode to detect for one of three signal values corresponding to acknowledgement (ACK), negative acknowledgement (NACK), and discontinuous transmission (DTX); and
processing the received signaling in the HS-SCCH less operating mode to detect for one of two signal values corresponding to ACK and DTX.

33. The method of claim 30, further comprising:
sending a first power offset for acknowledgement (ACK) and a second power offset for negative acknowledgement (NACK) in the regular HS-SCCH operating mode to the UE,
wherein the signaling comprises ACK, and wherein the first and second power levels are determined based on the first and second power offsets, respectively.

34. An apparatus for wireless communication, comprising:
means for receiving signaling sent by a user equipment (UE) at a first power level in a regular HS-SCCH operating mode; and
means for receiving the signaling sent by the UE at a second power level in an HS-SCCH less operating mode, the second power level being higher than the first power level.

35. The apparatus of claim 34, further comprising:
means for performing detection for the received signaling in the regular HS-SCCH operating mode to obtain a ternary indication sent by the UE; and
means for performing detection for the received signaling in the HS-SCCH less operating mode to obtain an on/off keying (OOK) indication sent by the UE.

36. The apparatus of claim 34, further comprising:
means for processing the received signaling in the regular HS-SCCH operating mode to detect for one of three signal values corresponding to acknowledgement (ACK), negative acknowledgement (NACK), and discontinuous transmission (DTX); and
means for processing the received signaling in the HS-SCCH less operating mode to detect for one of two signal values corresponding to ACK and DTX.

37. The apparatus of claim 34, further comprising:
means for sending a first power offset for acknowledgement (ACK) and a second power offset for negative acknowledgement (NACK) in the regular HS-SCCH operating mode to the UE,
wherein the signaling comprises ACK, and wherein the first and second power levels are determined based on the first and second power offsets, respectively.

38. A computer-readable medium comprising code, which, when executed by a processor, causes the processor to perform operations for wireless communication, the computer-readable medium comprising:
code for causing at least one computer to receive signaling sent by a user equipment (UE) at a first power level in a regular HS-SCCH operating mode; and
code for causing at least one computer to receive the signaling sent by the UE at a second power level in an HS-SCCH less operating mode, the second power level being higher than the first power level.

* * * * *